United States Patent [19]

Levy

[11] Patent Number: 4,726,120

[45] Date of Patent: Feb. 23, 1988

[54] MEASURING STYLUS AND X-Y DIGITIZER INCLUDING SAME

[76] Inventor: Nessim I. Levy, 13 Habrosh Street, Savyon, Israel

[21] Appl. No.: 22,226

[22] Filed: Mar. 5, 1987

[30] Foreign Application Priority Data

Mar. 7, 1986 [IL] Israel .......................................... 78073

[51] Int. Cl.$^4$ .......................... G01B 5/03; G01B 11/03
[52] U.S. Cl. ..................................................... 33/1 M
[58] Field of Search ...................... 33/1 M, 1 R, 23.08, 33/23.11, 25; 350/110-116, 241-249, 252; 353/101

[56] References Cited

U.S. PATENT DOCUMENTS

| 1,900,332 | 3/1933 | Coradi et al. ................... 33/23.11 X |
| 2,674,042 | 4/1954 | Ott .......................................... 33/252 |
| 2,993,278 | 7/1961 | Lory ...................................... 33/122 |

FOREIGN PATENT DOCUMENTS 0076901 6/1980 Japan .................................. 33/1 M Primary Examiner—Harry N. Haroian
Attorney, Agent, or Firm—Benjamin J. Barish

[57] ABSTRACT

A measuring stylus comprises a holder movable over a medium to be measured by the stylus and a lens floatingly mounted in the holder and biased to engage the measured medium. The underface of the lens engaging the medium is formed with a curved surface to provide a small area of contact with the medium, and is further formed with a visual measuring mark on the small area of contact with the medium.

20 Claims, 4 Drawing Figures

MEASURING STYLUS AND X-Y DIGITIZER INCLUDING SAME

BACKGROUND OF THE INVENTION

The present invention relates to a measuring stylus, and also to an X-Y digitizer including such a stylus.

One of the major sources of errors in measuring data by the use of an instrument including a measuring stylus is caused by visual parallax, which is defined as the apparent change in the direction of an object caused by a change in observational position that provides a new line of sight. Measuring errors caused by visual parallax are a function of two major elements, namely: (1) the distance between the measuring mark and the measured media, and (2) the angle of view. Thus, in a given fixed position of a measuring mark with respect to the measured medium, different angles of view produce parallax errors which increase with an increase of the angle of view with respect to a line normal to the measured medium. That is to say, the larger is the distance between the measuring mark and the measured medium, the greater will be the parallax error in any given angle of view with respect to a line normal to the measured medium.

One manner of reducing parallax errors is by the optical projection of the measuring mark on the measured medium. However, when the instrument is to be used with media of different thicknesses, the optical projection system requires that the projected measuring mark be refocussed as necessary each time a different thickness medium is being measured. The optical projection system must therefore be sufficiently sophisticated to permit the operator to refocus the measuring mark for different thickness media. In addition, such a system requires a high degree of expertise by the operator in order to refocus the projected measuring mark so as to avoid parallax errors.

SUMMARY OF THE INVENTION

An object of the present invention is to provide a measuring stylus having advantages in the above respects for reducing or eliminating parallax errors.

According to a broad aspect of the present invention, there is provided a measuring stylus comprising a holder movable over a medium to be measured by the stylus; and a lens floatingly mounted in the holder and biased to engage the measured medium; the underface of the lens engaging the medium being formed with a curved surface to provide a small area of contact with the medium, and being further formed with a visual measuring mark on the small area of contact with the medium.

In the preferred embodiment of the invention described below, the lens is floatingly mounted in an opening formed in the holder. More particularly, the lens is of cylindrical configuration and is floatingly mounted in a cylindrical opening in the holder. Also, the lens and opening are formed with complementary ribbed and recessed surfaces to permit axial movement, but not rotational movement, of the lens in the opening.

When the measuring stylus is to be used in a horizontal position for measuring horizontally extending media, the lens may be biased by gravity into engagement with the medium. On the other hand, if the measuring stylus is to be used with non-horizontally extending media, the lens may be biased by a spring into engagement with the medium.

The invention also provides an X-Y digitizer including the above measuring stylus.

Measuring styluses may be built in accordance with the above features of the present invention substantially eliminating parallax errors despite different thicknesses of the measured medium. Such measuring syluses may be of relatively simple construction since they do not require an optical projection system, and may be used in a simple manner not requiring any particular expertise by the operator.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
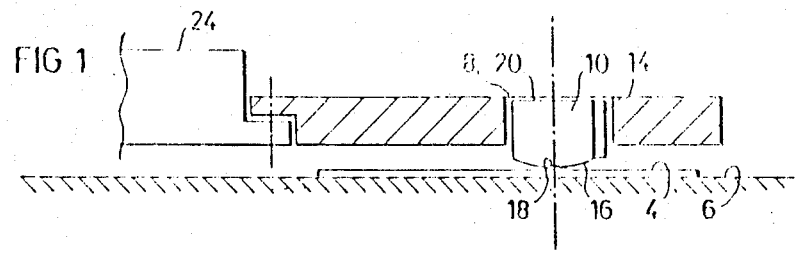
FIG. 1 is a side elevational view, partly in section, illustrating one form of measuring stylus constructed in accordance with the present invention.
Figure 2:
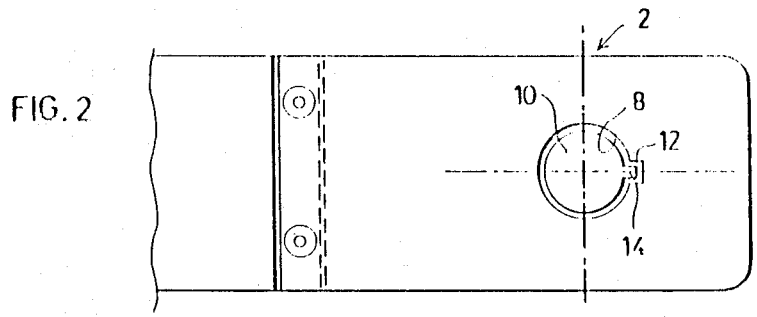
FIG. 2 is a top plan view of the measuring stylus of FIG. 1.

The measuring stylus illustrated in FIGS. 1 and 2 of the drawings comprises a holder 2 movable over a medium 4 to be measured. The measured medium 4 is supported on a flat horizontal table 6 and may be, for example, a graphic record medium to be digitized.

Holder 2 is formed with an opening 8 therethrough of generally cylindrical configuration. Disposed within opening 8 is a lens 10 also of generally cylindrical configuration. The outer diameter of lens 2 is slightly less than the diameter of opening 8 so that the lens is freely movable axially within opening 8. However, lens 10 and opening 8 have complementary ribbed and recessed surfaces, in the form of an axially-extending recess 12 in opening 8 and axially-extending rib 14 in lens 10, permitting axial movement but not rotational movement of the lens within the opening.

The undersurface 16 of lens 10 is curved, as shown at 16 (FIG. 1) to provide a point contact of the undersurface with the measured medium 4. A visually discernable marking dot 18 is applied to this point contact of the lens undersurface with the measured medium.

The upper surface 20 of lens 10 is preferably flat.

Holder 2, including its lens 10, is attached to an arm 24, such as an arm of an X-Y digitizer which is movable over the upper surface of the measured medium 4 in order to digitize various points on that medium.

It will be seen that 1ens 10, including its measuring mark 18, is floatingly mounted on holder 2 such that the lens is biased by gravity to bring its measuring mark 18 into contact with the upper surface of the measured medium 4 irrespective of the thickness of the medium. Accordingly, the measuring mark 18 will always lie substantially in the plane of the upper face of the measured medium 4. Thus, parallax is substantially eliminated irrespective of the angle at which the measuring mark 18 is viewed.

The measuring stylus illustrated in FIGS. 1 and 2 is particularly useful where the measured medium is to be supported in a horizontal position on a horizontal table 6, which thereby allows gravity to bias the lens 10 towards the measured medium to bring its measuring mark 18 into contact with the upper surface of the measured medium. Where, however, the measuring stylus is to be used with a medium disposed in a non-horizontal position, for example in a vertical position, the holder is provided with a light spring for biasing the lens into engagement with the medium.

Figure 3:
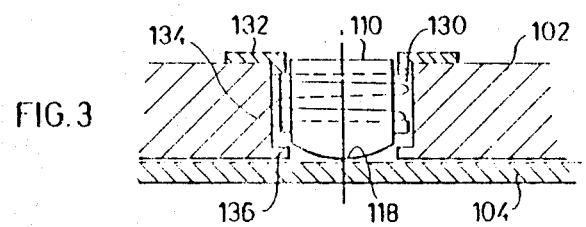
FIG. 3 is a fragmentary sectional view illustrating a modification.

Such an arrangement is illustrated in FIG. 3, wherein a spring, therein designated 130, is provided to bias the lens 110 disposed within an opening in the holder 102 into engagement with the measured medium 104, such that the measuring mark 118 formed in the curved undersurface of the lens 110 is always in contact with the upper face of the measured medium 104 irrespective of its thickness.

In the example of such a spring-biased arrangement illustrated in FIG. 3, the spring 130 is a coil spring enclosing lens 110 and interposed between a retainer ring 132 disposed at the outer end of the opening in holder 102, and an axial rib 134 secured to, or integrally formed with, the inner end of lens 110. A further retainer ring or shoulder 136 is provided at the inner end of the opening formed in holder 102 to retain the lens within the opening but to permit it to be moved axially of the opening into engagement with the record medium 104 irrespective of its thickness.

In all other respects, the measuring stylus illustrated in FIG. 3 is constructed in the same manner as described above with respect to FIG. 1 and 2, including the complementary axially-extending rib (14) formed in the lens received within the axially-extending recess (12) formed in the holder for permitting axial movement, but not rotational movement, of the lens within the opening.

While the spring-biased arrangement illustrated in FIG. 3 is particularly useful with respect to media disposed in a non-horizontal (e.g. vertical) position, it will be appreciated that this arrangement could also be used with horizontally-disposed media, in order to more positively assure contact of the measured mark (18, 118) formed in the curved undersurface of the lens (10, 110) with the upper face of the measured medium irrespective of the thickness of the medium.

Figure 4:
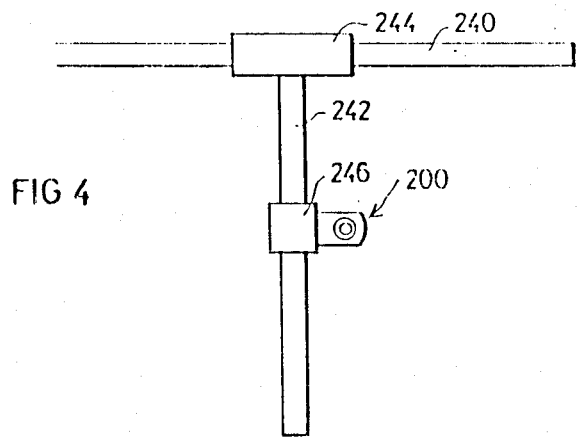
FIG. 4 illustrates an X-Y digitizer including a measuring stylus in accordance with the present invention.

FIG. 4 illustrates an X-Y digitizer including the novel measuring stylus, therein designated 200, which may be either in the form of FIGS. 1 and 2 or of FIG. 3.

Thus, the X-Y digitizer illustrated in FIG. 4 includes a first arm 240 which may be fixed to extend along one orthogonal axis, e.g. the X-axis, and a second arm 242 extending along the other orthogonal axis, i.e., the Y-axis. Arm 242 is slidably mounted by a slide block 244 along arm 240. The measuring stylus 200 is slidably mounted on arm 242 by a slide block 246 so as to be movable along the length of that arm, i.e. along the Y-axis.

It will thus be seen that the measuring stylus 200 may be moved along the X-axis by sliding arm 242 along arm 240, and may also be moved along the Y-axis by sliding the measuring stylus along arm 242, so as to locate the measuring mark (18, FIG. 1) at any position of the measured medium underlying the stylus. It will also be seen that, by virtue of the floating mounting of the lens (e.g. 10, FIGS. 1, 2), and by virtue of the bias (gravity, in FIGS. 1, 2, or spring in FIG. 3) of the lens into engagement with the measured medium, the measuring mark (18, 118) formed at the point contact of the underface of the lens will always be located substantially in the plane of the upper surface of the measured medium, irrespective of the thickness of the measured medium, thereby substantially eliminating parallax irrespective of the angle of view of the measuring mark. The point contact also reduces friction during the sliding movements of the measuring stylus.

While the invention has been described with respect to two preferred embodiments, it will be appreciated that many other variations and modifications of the invention may be made. In addition, while the invention has been described with respect to an X-Y digitizer, it will be appreciated that it can be used in many other applications where a stylus is used for measuring purposes.

What is claimed is:

1. A measuring stylus comprising:
    a holder movable over a medium to be measured by the stylus;
    and a lens floatingly mounted in said holder and biased to engage the measured medium;
    the underface of said lens engaging said medium being formed with a curved surface to provide a small area of contact with said medium, and being further formed with a visual measuring mark on said small area of contact with said medium.

2. The measuring stylus according to claim 1, wherein said lens is floatingly mounted in an opening formed in said holder.

3. The measuring stylus according to claim 2, wherein said lens is of cylindrical configuration and is floatingly mounted in a cylindrical opening in said holder; said lens and opening being formed with complementary ribbed and recessed surfaces to permit axial movement, but not rotational movement, of the lens in said opening.

4. The measuring stylus according to claim 3, wherein said lens is formed with an axially-extending rib, and said opening is formed with an axially-extending recess receiving said rib.

5. The measuring stylus according to claim 1, wherein the underface of said lens is curved to provide a point contact thereof with said measuring medium; said measuring mark being a dot located at said point contact.

6. The measuring stylus according to claim 1, wherein said lens is biased by gravity into engagement with said measuring medium.

7. The measuring stylus according to claim 1, wherein said lens is biased by a spring into engagement with said measuring medium.

8. A measuring stylus comprising:
    a holder movable over a medium to be measured by the stylus;
    and a lens floatingly mounted in said holder and biased to engage the measured medium;
    the underface of said lens engaging said medium being formed with a curved surface to provide a point contact with said medium, and being further formed with a visual measuring mark on said point contact with said medium.

9. The measuring stylus according to claim 8, wherein said lens is floatingly mounted in an opening formed in said holder.

10. The measuring stylus according to claim 9, wherein said lens is of cylindrical configuration and is floatingly mounted in a cylindrical opening in said holder; said lens and opening being formed with complementary ribbed and recessed surfaces to permit axial movement, but not rotational movement, of the lens in said opening.

11. The measuring stylus according to claim 10 wherein said lens is formed with an axially-extending rib, and said opening is formed with an axially-extending recess receiving said rib.

12. The measuring stylus according to claim 8, wherein said lens is biased by gravity into engagement with said measuring medium.

13. The measuring stylus according to claim 8, wherein said lens is biased by a spring into engagement with said measuring medium.

14. An X-Y digitizer including:
a first arm extending along one orthogonal axis;
a second arm extending along a second orthogonal axis and slidably mounted on said first arm along said first axis;
and a measuring stylus in accordance with claim 1 carried by said second arm and slidable thereon along said second orthogonal axis.

15. The X-Y digitizer according to claim 14, wherein said lens is floatingly mounted in an opening formed in said holder.

16. The X-Y digitizer according to claim 15, wherein said lens is of cylindrical configuration and is floatingly mounted in a cylindrical opening in said holder; said lens and opening being formed with complementary ribbed and recessed surfaces to permit axial movement, but not rotational movement, of the lens in said opening.

17. The X-Y digitizer according to claim 16, wherein said lens is formed with an axially-extending rib, and said opening is formed with an axially-extending recess receiving said rib.

18. The X-Y digitizer according to claim 14, wherein the underface of said lens is curved to provide a point contact thereof with said measuring medium; said measuring mark being a dot located at said point contact.

19. The X-Y digitizer according to claim 14, wherein said lens is biased by gravity into engagement with said measuring medium.

20. The X-Y digitizer according to claim 14, wherein said lens is biased by a spring into engagement with said measuring medium.

* * * * *